(12) United States Patent
Chamuczynski

(10) Patent No.: US 10,247,938 B2
(45) Date of Patent: Apr. 2, 2019

(54) PASSIVE REDUCTION OR ELIMINATION OF FROST AND FOG WITH EXPANDABLE AIR CONTAINER

(71) Applicant: FLEXTRONICS AUTOMOTIVE, INC., Newmarket (CA)

(72) Inventor: Przemyslaw Chamuczynski, Toronto (CA)

( * ) Notice: Subject to any disclaimer, the term of this patent is extended or adjusted under 35 U.S.C. 154(b) by 65 days.

(21) Appl. No.: 14/275,555

(22) Filed: May 12, 2014

(65) Prior Publication Data

US 2015/0323784 A1 Nov. 12, 2015

(51) Int. Cl.
*G02B 27/00* (2006.01)

(52) U.S. Cl.
CPC .................................. *G02B 27/0006* (2013.01)

(58) Field of Classification Search
CPC .... G02B 27/0006; G02B 23/16; G02B 1/105; G02B 23/22; G02B 1/18; B60R 1/0602; F21V 31/00–31/03; F21S 48/337
USPC ........ 359/507–517; 15/405–408, 310, 312.1, 15/312.2, 313, 314, 316.1, 250, 521.01, 15/250.02, 250.003
See application file for complete search history.

(56) References Cited

U.S. PATENT DOCUMENTS

| | | | | |
|---|---|---|---|---|
| 3,854,040 A | * | 12/1974 | Heiderer | F21S 48/337 362/547 |
| 5,522,769 A | * | 6/1996 | DeGuiseppi | F16H 57/027 454/270 |
| 5,805,364 A | * | 9/1998 | Ooi | G02B 7/026 359/513 |
| 6,071,000 A | * | 6/2000 | Rapp | F21S 48/335 362/362 |
| 6,842,286 B2 | * | 1/2005 | Ertel | G01N 21/45 250/237 G |
| 8,499,410 B2 | * | 8/2013 | Yoshimura | B08B 5/026 15/309.1 |
| 2008/0173233 A1 | | 7/2008 | Liu | |
| 2009/0153314 A1 | | 6/2009 | Young et al. | |
| 2010/0071150 A1 | | 3/2010 | Kereth | |
| 2013/0308189 A1 | * | 11/2013 | Gloege | C09D 183/06 359/507 |
| 2014/0005484 A1 | * | 1/2014 | Charles | A61B 17/02 600/201 |

FOREIGN PATENT DOCUMENTS

| | | |
|---|---|---|
| GB | 1575695 A | 9/1980 |
| JP | S30015673 | 10/1955 |
| JP | S6130820 U | 2/1986 |
| JP | H02279489 A | 11/1990 |
| JP | H07015151 A | 1/1995 |

(Continued)

OTHER PUBLICATIONS

JP 07-015151A, Otsubo-machine translation from J-Plat Pat.*

(Continued)

*Primary Examiner* — Kristina M Deherrera
(74) *Attorney, Agent, or Firm* — Volpe and Koenig, P.C.

(57) ABSTRACT

Lens fogging or frosting on an instrument lens may be reduced or prevented by hermetically sealing the instrument housing. Damage or rupture of the hermetically sealed housing due to an increase in pressure within the housing may be avoided while maintaining the hermetic seal by connecting a reservoir having an expandable volume to the housing.

14 Claims, 10 Drawing Sheets

(56) References Cited

FOREIGN PATENT DOCUMENTS

| JP | H11116884 A | 4/1999 |
|---|---|---|
| JP | 2000208948 A | 7/2000 |
| JP | 2006184154 A | 7/2006 |
| JP | 2013222796 A | 10/2013 |

OTHER PUBLICATIONS

JP 02279489A Oka machine translation from ProQuest.*
EESR dated Dec. 1, 2017 in Corresponding European Application 14 89 1907.
Japanese Language Office Action dated Nov. 22, 2017 in corresponding Japanese Application, and machine translation.

* cited by examiner

PASSIVE REDUCTION OR ELIMINATION OF FROST AND FOG WITH EXPANDABLE AIR CONTAINER

FIELD OF INVENTION

The invention relates to reducing frost or fogging on a lens or other surface.

BACKGROUND

Condensation may occur on a surface of an object when its temperature drops below the dew point for the surrounding air. This effect may be observed in the formation of dew on grass, condensation of water droplets on a drinking glass, or fogging of a window or lens. In freezing conditions, condensation may accumulate on a surface of an object in the form of frost.

Such fogging or frosting may be undesirable on lens or other surface through which it is desirable to see or otherwise transmit light, for example, on the lens of a vehicle instrument gauge.

SUMMARY

Lens fogging or frosting on an instrument lens may be reduced or prevented by hermetically sealing the instrument housing. Damage or rupture of the hermetically sealed housing due to a change in pressure within the housing may be avoided while maintaining the hermetic seal by connecting a reservoir having an expandable volume to the housing.

BRIEF DESCRIPTION OF THE DRAWINGS

A more detailed understanding may be had from the following description, given by way of example in conjunction with the accompanying drawings wherein.

DETAILED DESCRIPTION

One example of a surface upon which unwanted condensation may occur is a lens covering an instrument, instrument panel, or instrument cluster of a vehicle. It is noted that the term lens as used herein includes both refracting and non-refracting light transmitting elements, such as view windows, and translucent as well as transparent elements. Fogging of the lens may occur either on the inside or outside surface of the lens depending on environmental conditions. While it may be possible to clear fogging from the outside surface of the lens, fogging on the inside surface may be more difficult to remove depending on the configuration of the cluster.

Fogging on the inside surface of the lens may occur for example when humidity is present in or enters the instrument cluster. In this case, if the temperature of the lens drops below the dew point, condensation of the moisture in the air on the inside surface of the lens may occur.

One approach for reducing fogging may be to apply an anti-fog treatment such as a coating, surface, or texture to one or more surfaces of the lens. Anti-fog treatments may include surfactants or hydrophilic surfaces or substances for example. In this case, moisture condensing on the lens may be spread out or absorbed by the anti-fog treatment such that the condensation is less visible, which may result in less obstruction of visibility or light transmission through the lens.

However if the temperature of the lens drops below the frost point or freezing temperature of the moisture, some of the condensation otherwise absorbed or spread by the anti-fog treatment may freeze and create frost that obstructs visibility through the lens. Fogging in such freezing conditions may be referred to as frosting or icing.

Another approach for reducing lens fogging which may reduce the formation of frost on an inside surface of the lens may be to hermetically seal the instrument cluster. If an instrument cluster is constructed as a hermetically sealed unit where the interior has low moisture content and is hermetically isolated from the exterior of the instrument cluster, both fogging and icing may be reduced because of the lack of available moisture for condensation.

However, hermetically sealing an instrument cluster may allow pressure to build within the instrument cluster with respect to the exterior atmospheric pressure. The cluster may also be subjected to cyclical pressure changes due to cyclical temperature and/or weather changes, such as night and day temperature transitions or engine or cabin temperature or pressure changes. These cyclical changes may arise where the cluster is mounted to a vehicle either inside the cabin of a vehicle or proximate to the engine, or where the vehicle experiences rapid changes in altitude for example. These pressures may increase stress and fatigue on the components of the cluster, decreasing operational life of the cluster components.

Figure 1:
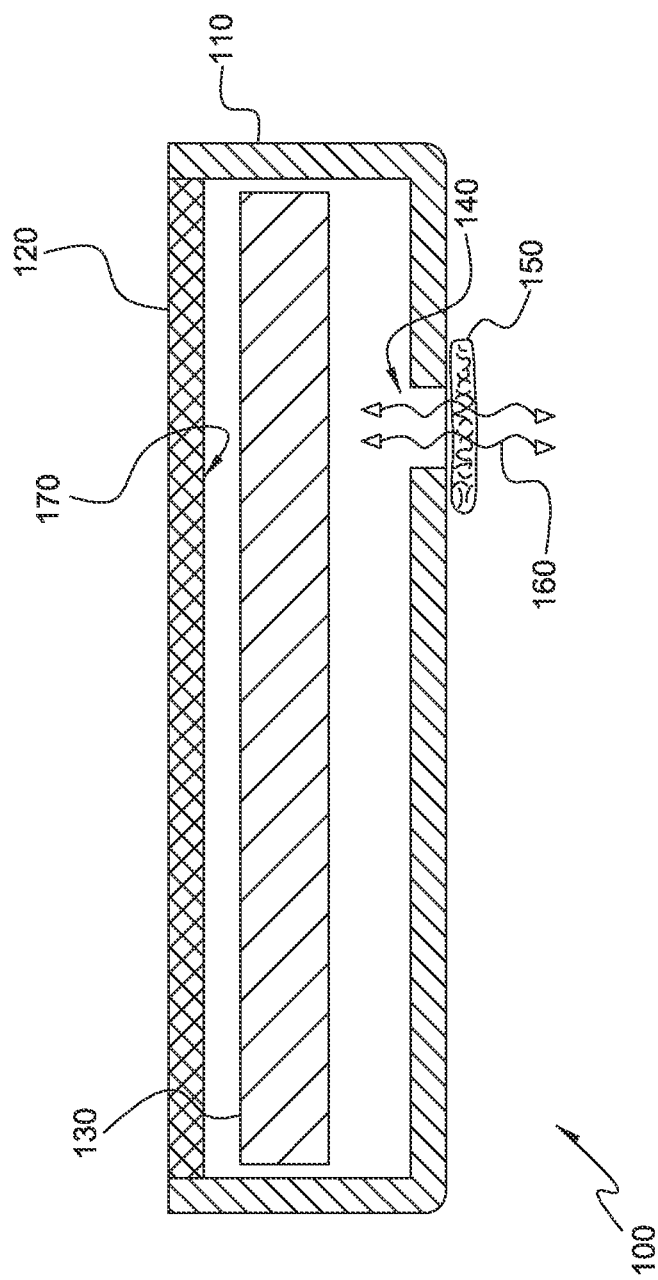
FIG. 1 is cross-sectional view of an example instrument cluster.

FIG. 1 illustrates an example instrument cluster 100 having a housing 110, lens 120, and internal components 130. Housing 110 includes a vent 140 which may permit a pressure difference between the inside and outside of housing 110 to equalize. Vent 140 is covered by cover 150 which may prevent debris from entering housing 110. Cover 150 may include a membrane, screen, or other suitable material through which air and moisture 160 may pass. An anti-fog treatment 170 may be applied to the inside surface of lens 120. As discussed herein, the anti-fog treatment may include surfactants or hydrophilic surfaces or substances for example. Moisture condensing on the inside surface of lens 120 may be spread out or absorbed by the anti-fog treatment 170 such that it is less visible and does not obscure visibility through the lens. However if the temperature of the lens 120 drops below the freezing temperature of the moisture, some of the condensation absorbed or spread by the anti-fog treatment 170 may freeze and create frost that obstructs visibility through the lens.

Figure 2:
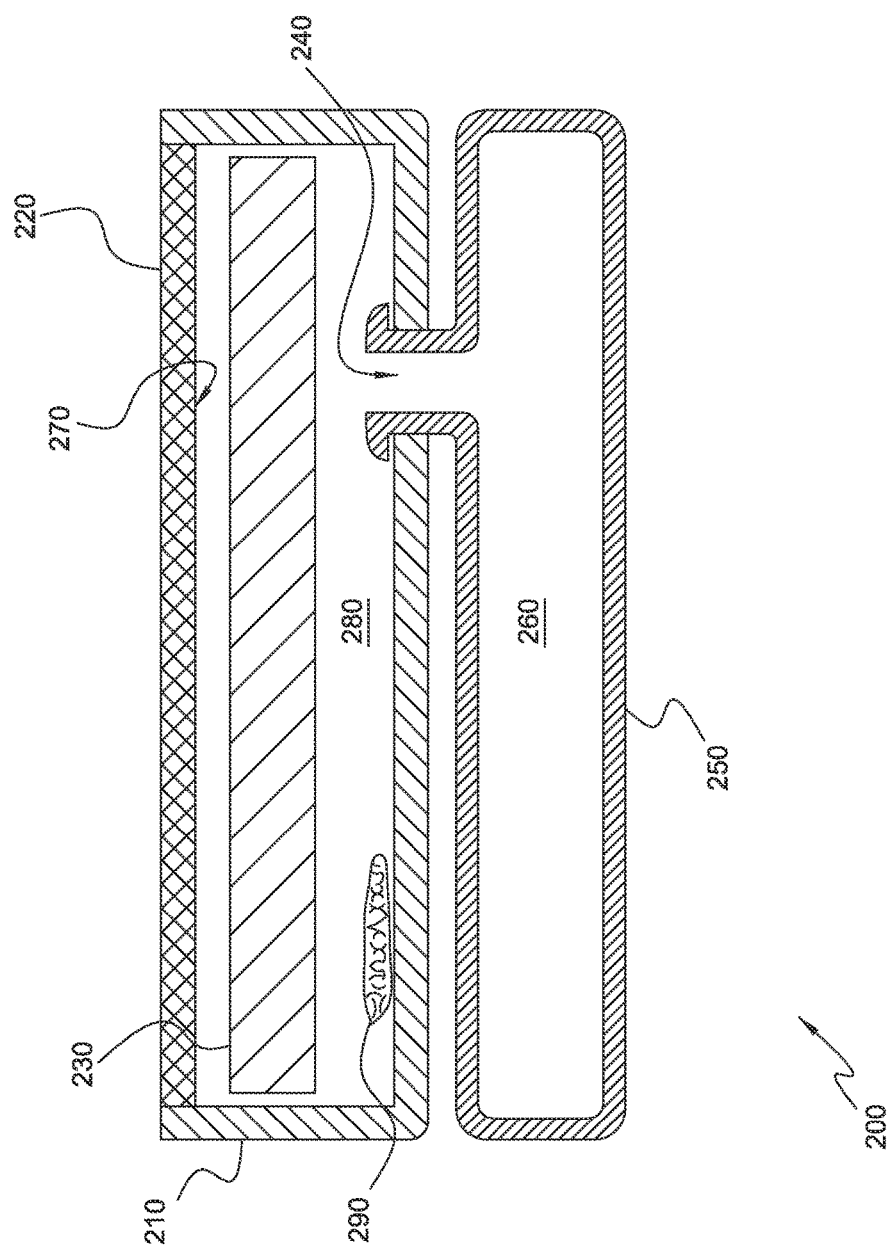
FIG. 2 is cross-sectional view of an example instrument cluster having an external expandable reservoir.

FIG. 2 illustrates an example instrument cluster 200 having an expandable external reservoir 250.

Instrument cluster 200 includes a housing 210, lens 220, and internal components 230. Housing 210 includes vent 240 which may permit a pressure difference between the inside and outside of housing 210 to equalize. Vent 240 is connected to an expandable external reservoir 250 which may be hermetically connected to housing 210 such that the interior space 260 of reservoir 250 is contiguous with the interior space 280 of housing 210, and such that moisture and air are prevented from entering housing 210 from outside of housing 210 or reservoir 250.

Expandable external reservoir 250 may include a bladder, bellows, sleeve, piston, or other suitable expandable reservoir structure, and may be constructed of a material or materials which substantially resist the passage of moisture, such as suitable rubber or rubber compounds, plastics, silicone, or other materials or combinations of materials.

If pressure within housing 210 increases, the pressure increase may force air or other gasses present within housing 210 to exit through vent 240 and enter reservoir 250, possibly expanding reservoir 250, and thus equalizing the pressure or reducing the change in pressure. If pressure within housing 210 decreases, the pressure decrease may force air or other gasses present within reservoir 250 to enter housing 210 through vent 240, possibly contracting reservoir 250, and thus equalizing the pressure or reducing the change in pressure.

A desiccant 290 may be located within housing 210 and may absorb any moisture present within housing 210 due to leakage or introduced during assembly, for example. It will be appreciated that desiccant 290 may instead or additionally be located in reservoir 250, or may be omitted in other implementations.

An anti-fog treatment 270 may be applied to the inside surface of lens 220. It is noted that anti-fog treatment 270 may be omitted in some implementations. As discussed herein, the anti-fog treatment may include surfactants or hydrophilic surfaces or substances for example. Moisture condensing on the inside surface of lens 220 may be spread out or absorbed by the anti-fog treatment 270 such that it is less visible and does not obscure visibility through the lens. However if the temperature of the lens 220 drops below the freezing temperature of the moisture, some of the condensation absorbed or spread by the anti-fog treatment 270 may freeze and create frost that obstructs visibility through the lens. The formation of frost on the inside surface of lens 220 may be reduced however due to the isolated low moisture environment within housing 210. This arrangement may also improve the service life of internal components 230 by reducing their exposure to moisture and pressure changes.

Figure 3:
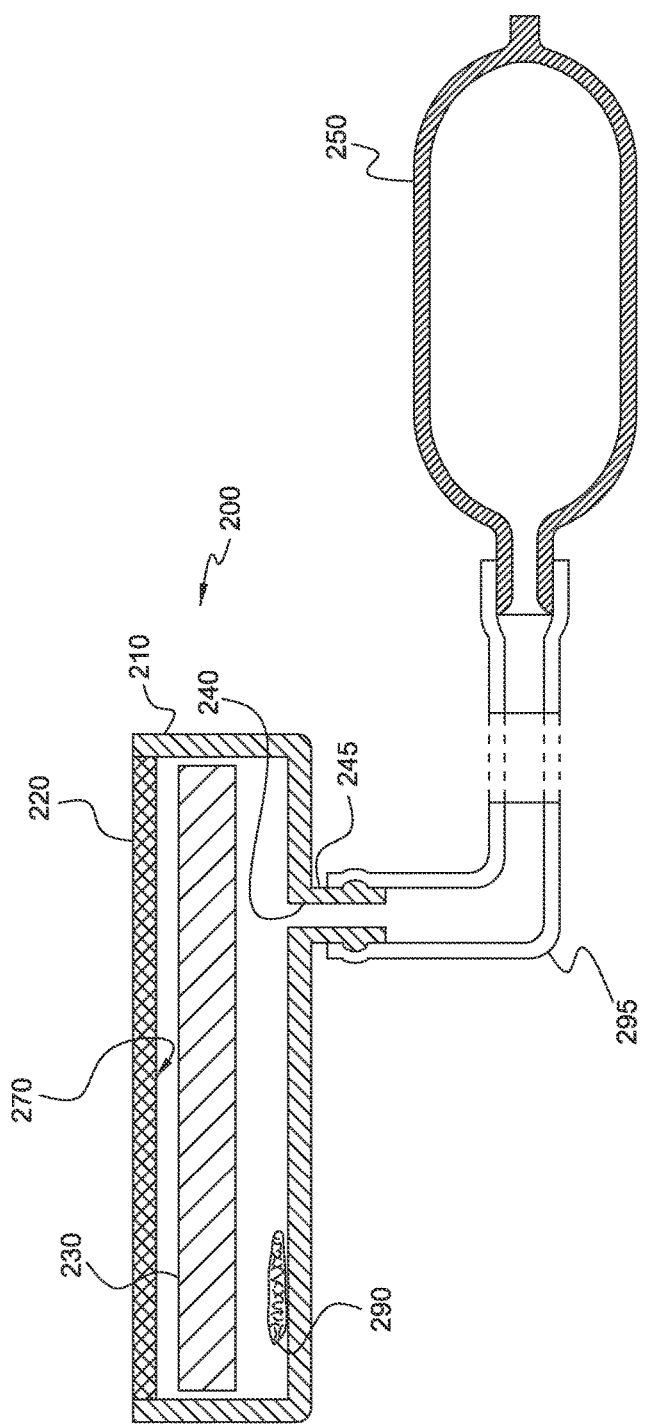
FIG. 3 is cross-sectional view of an example instrument cluster having a remotely located external expandable reservoir.

FIG. 3 illustrates the example instrument cluster 200 shown and described with respect to FIG. 2, where the reservoir 250 has been located remotely to the housing 210 using a tube 295. In FIG. 3, vent 240 comprises or is attached to a fitting 245, and a tube 295 connects fitting 245 to reservoir 250. The arrangement shown in FIG. 3 may be used for example to enable the reservoir 250 to be installed in a location remote from instrument cluster 200 in situations where the housing 210 is installed in a constrained space. The arrangement shown in FIG. 3 may also be used to enable the reservoir 250 to be installed in a location having a different temperature from the housing 210. For example, in a situation where the temperature of instrument cluster 250 rises, air within cluster 250 may expand into tube 295 and reservoir 250 where it may cool, limiting expansion and strain of reservoir 250. Reservoir 250 may also be installed in a location having a different pressure from housing 210.

Figure 4:
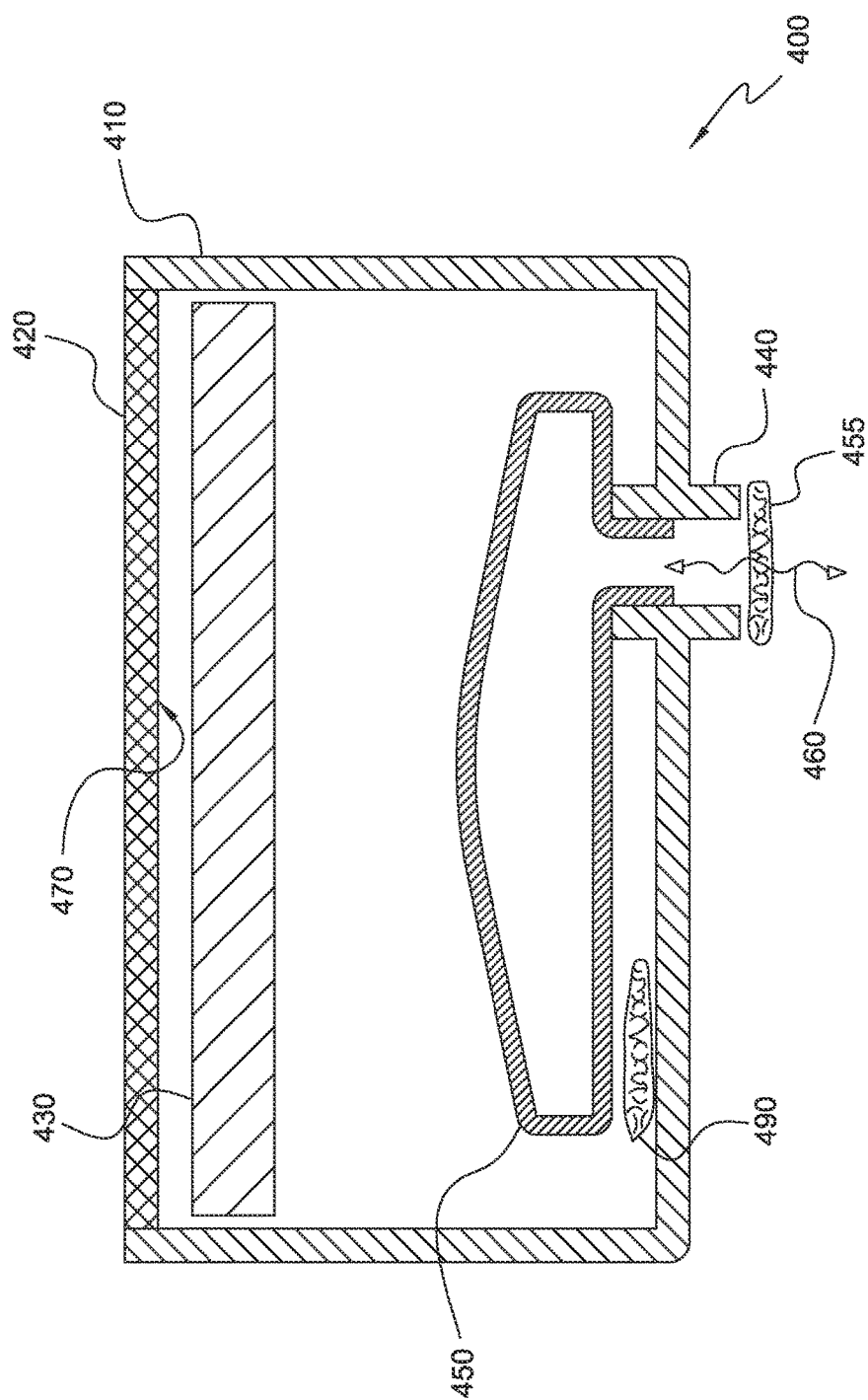
FIG. 4 is cross-sectional view of an example instrument cluster having an internal expandable reservoir.

FIG. 4 illustrates an example instrument cluster 400 having an expandable internal reservoir 450.

Instrument cluster 400 includes a housing 410, lens 420, and internal components 430. Housing 410 includes a vent 440 which may permit a pressure difference between the inside and outside of housing 410 to equalize. Vent 440 may be hermetically connected to an expandable internal reservoir 450 such that moisture and air are prevented from entering housing 410. Vent 440 may be covered by cover 455 which may serve to prevent debris from entering internal reservoir 450. However it is noted that cover 455 may be omitted in some implementations. Cover 450 may include a membrane, screen, or other suitable material through which air and moisture 460 may pass.

Expandable internal reservoir 450 may include a bladder, bellows, piston, or other suitable expandable reservoir structure, may be flexible, and may be constructed of a material or materials which substantially resist the passage of moisture, such as suitable rubber or rubber compounds, plastics, silicone, or other materials or combinations of materials.

If pressure within housing 410 increases, the pressure increase may force air or other gasses present within reservoir 450 to exit reservoir 450, possibly contracting reservoir 450, and thus equalizing the pressure or reducing the change in pressure by increasing the volume within housing 410. If pressure within housing 410 decreases, the pressure decrease may force air or other gasses present exterior to reservoir 450 to enter reservoir 450, possibly expanding reservoir 450, and thus equalizing the pressure or reducing the change in pressure by reducing the volume within housing 410.

A desiccant 490 may be located within housing 410 and may absorb any moisture present within housing 410 due to leakage or introduced during assembly, for example. It is noted that desiccant 490 may be omitted in other implementations.

An anti-fog treatment 470 may be applied to the inside surface of lens 420. It is noted that anti-fog treatment 470 may be omitted in some implementations. As discussed herein, the anti-fog treatment may include surfactants or hydrophilic surfaces or substances for example. Moisture condensing on the inside surface of lens 420 may be spread out or absorbed by the anti-fog treatment 470 such that it is less visible and does not obscure visibility through the lens. However if the temperature of the lens 420 drops below the freezing temperature of the moisture, some of the condensation absorbed or spread by the anti-fog treatment 470 may freeze and create frost that obstructs visibility through the lens. The formation of frost on the inside surface of lens 420 may be reduced however due to the isolated low moisture environment within housing 410. This arrangement may also improve the service life of internal components 430 by reducing their exposure to moisture and pressure changes.

Positioning reservoir 450 internal to housing 410 may have the advantage of providing protection to reservoir 450 which may be made using flexible materials which are more prone to damage or rupture than housing 410.

Figure 5B:
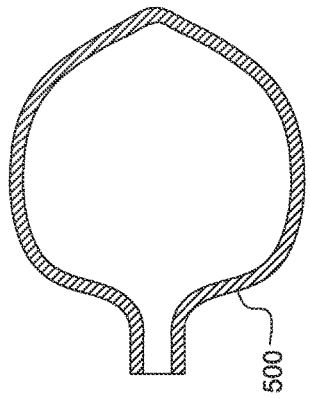
FIGS. 5A and 5B are cross sectional views of a bladder shaped expandable reservoir in an unexpanded and an expanded state respectively.
Figure 5A:
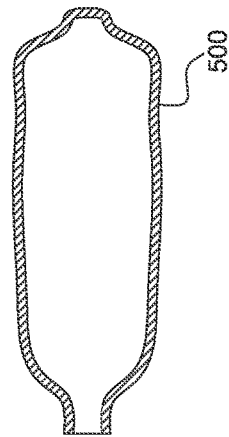

FIGS. 5A and 5B illustrate an example expandable reservoir 500 having a simple bladder shape, which may be usable with the various techniques and devices discussed herein. FIGS. 5A and 5B illustrate the expandable reservoir 500 in an unexpanded and expanded state respectively. Reservoir 500 may be flexible, and may be constructed of a material or materials which substantially resist the passage of moisture, such as suitable rubber or rubber compounds, plastics, silicone, or other materials or combinations of materials.

Figure 6B:
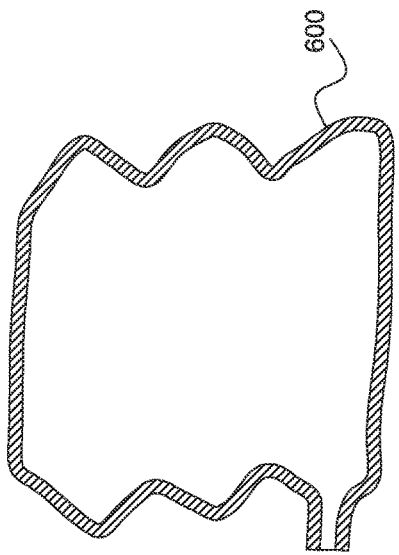
FIGS. 6A and 6B are cross sectional views of a bellows shaped expandable reservoir in an unexpanded and an expanded state respectively.
Figure 6A:
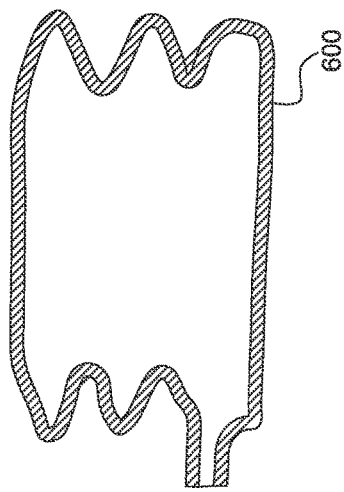

FIGS. 6A and 6B illustrate another example reservoir 600 having a bellows shape. FIGS. 6A and 6B illustrate the expandable reservoir 600 in an unexpanded and expanded state respectively. The geometry of reservoir 600 may be advantageous in controlling the direction of expansion of reservoir 600 for use in constrained spaces such as within an instrument cluster or other housing for example. Reservoir 600 may be flexible, and may be constructed of a material or materials which substantially resist the passage of moisture, such as suitable rubber or rubber compounds, plastics, silicone, or other materials or combinations of materials.

Figure 7A:
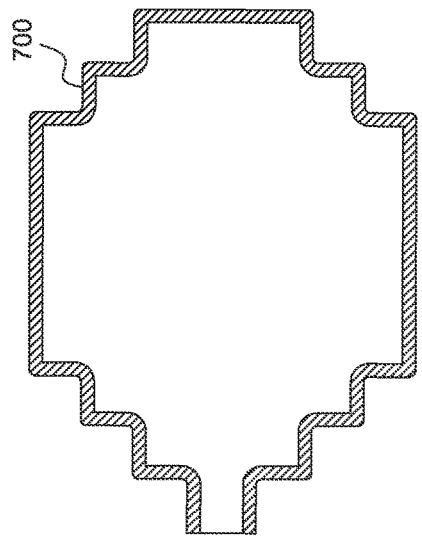
FIGS. 7A and 7B are cross sectional views of another bellows shaped expandable reservoir in an unexpanded and an expanded state respectively.
Figure 7B:
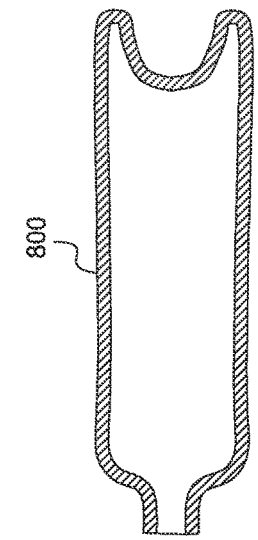

FIGS. 7A and 7B illustrate another example reservoir 700 having a bellows shape different from reservoir 600 shown and described with respect to FIGS. 6A and 6B. FIGS. 7A and 7B illustrate the expandable reservoir 700 in an unexpanded and expanded state respectively. The geometry of reservoir 700 may be advantageous in controlling the direction of expansion of reservoir 700 for use in constrained spaces such as within an instrument cluster or other housing for example. Reservoir 700 may be flexible, and may be constructed of a material or materials which substantially resist the passage of moisture, such as suitable rubber or rubber compounds, plastics, silicone, or other materials or combinations of materials.

Figure 8A:
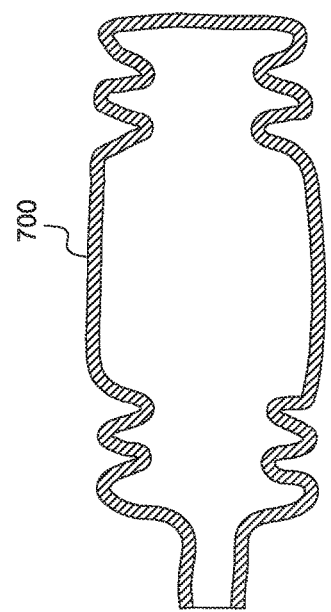
FIGS. 8A and 8B are cross sectional views of a sleeve shaped expandable reservoir in an unexpanded and an expanded state respectively.
Figure 8B:
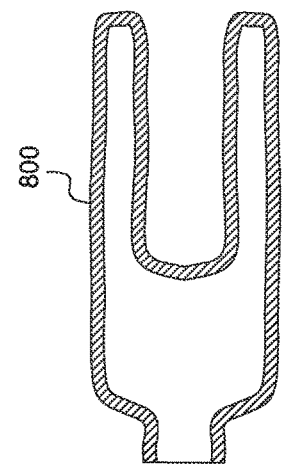

FIGS. 8A and 8B illustrate another example reservoir 800 having a sleeve configuration. FIGS. 8A and 8B illustrate the expandable reservoir 800 in an unexpanded and expanded state respectively. The geometry of reservoir 800 may be advantageous in controlling the direction of expansion of reservoir 800 for use in constrained spaces such as within an instrument cluster or other housing for example. Reservoir 800 may be flexible, and may be constructed of a material or materials which substantially resist the passage of moisture, such as suitable rubber or rubber compounds, plastics, silicone, or other materials or combinations of materials.

Figure 9A:
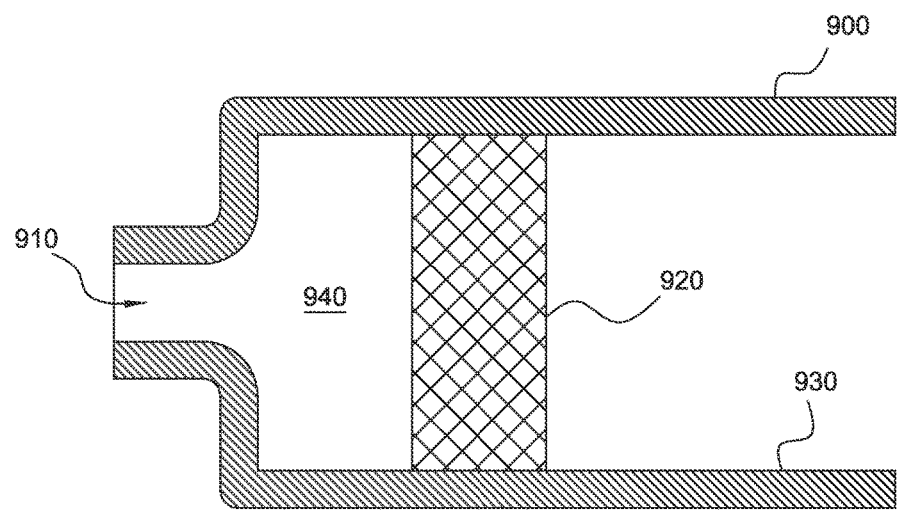
FIGS. 9A and 9B are cross sectional views of an expandable reservoir having a piston structure in an unexpanded and an expanded state respectively.
Figure 9B:
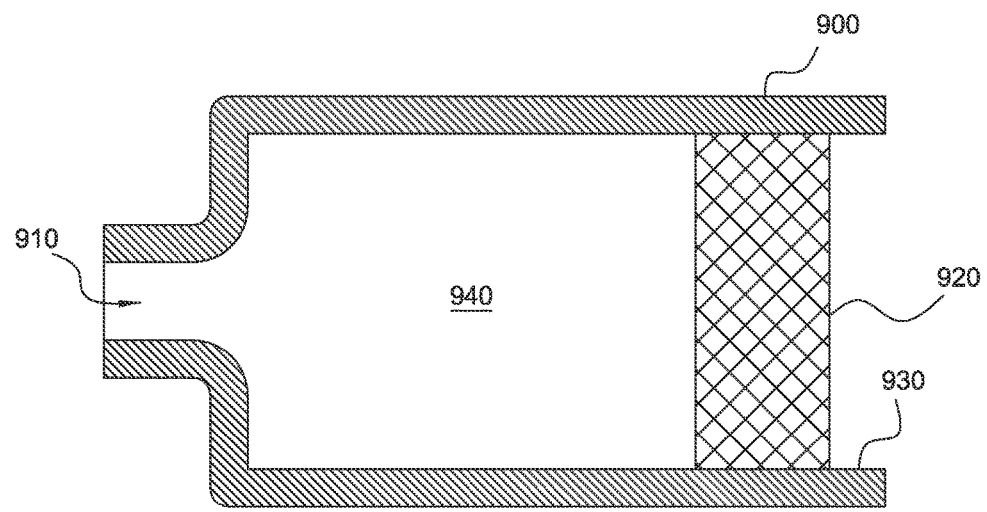

FIGS. 9A and 9B illustrate another example reservoir having a piston configuration. FIGS. 9A and 9B illustrate the reservoir 900 in an expanded and unexpanded state respectively. Reservoir 900 includes vent 910, bore 920 and piston 930. As air expands into vent 910 from an instrument cluster as described elsewhere herein for example, piston 920 is forced along bore 930 in a direction away from vent 910, expanding the internal chamber 940 of the reservoir. As air in the instrument cluster or other connected space contracts, pressure within chamber 940 decreases, drawing piston 930 toward vent 910, contracting the internal chamber 940 of the reservoir.

The construction and geometry of reservoir 900, which may be constructed using substantially rigid components, may provide a structure that has a greater service life and is more resistant to damage or rupture than a flexible bladder as elsewhere described herein. The construction and geometry of reservoir 900 may also provide a substantially fixed external shape in one or more dimensions and/or occupy a substantially fixed volume of space and/or require a substantially fixed amount of clearance, which may simplify assembly or installation.

Figure 10:
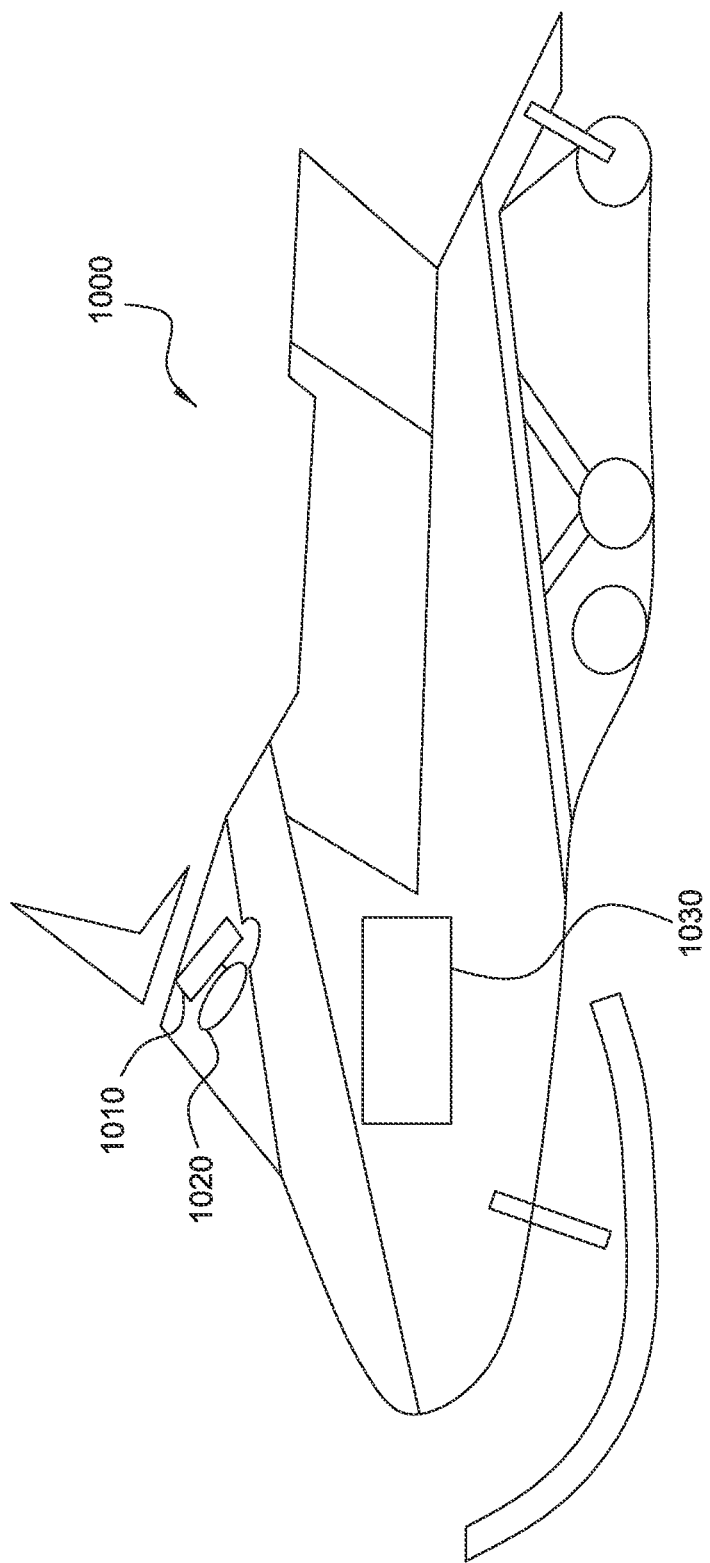
FIG. 10 is a side view of an example vehicle having an instrument cluster with an external expandable reservoir similar to the instrument cluster shown in FIG. 2.

FIG. 10 illustrates an example vehicle 1000 which includes an instrument cluster having a housing 1010, a lens (not shown), and an external reservoir 1020. The cluster, including housing 1010, lens, and reservoir 1020, may be configured similarly to cluster 200 as shown and described with respect to FIG. 2.

If the temperature of the lens drops below the dew or frost point of moisture within the housing 1010, the moisture may condense on the lens. However, the isolated low moisture environment within housing 1010 may reduce or prevent fogging or frosting of the inside surface of the lens as described herein. This arrangement may also improve the service life of internal components (not shown) of the instrument cluster by reducing their exposure to moisture as described herein.

Vehicle 1000 also comprises a motor 1030. When motor 1030 is running, its temperature may rise, heating the instrument cluster. Sun shining on the instrument cluster or other conditions may likewise cause its temperature to rise. As the temperature of the air within sealed housing 1010 rises, pressure within housing 1010 may increase. The rising pressure within housing 1010 may be relieved as air evacuates housing 1010 into reservoir 1020, which may expand as a consequence.

If motor 1030 is subsequently shut down, its temperature may drop, allowing the instrument cluster to cool. Nightfall or other conditions may likewise cause the temperature of the instrument cluster to drop. As the temperature of the air within sealed housing 1010 drops, pressure within housing 1010 may decrease. This falling pressure (negative pressure or vacuum) may be relieved as air is drawn into housing 1010 from reservoir 1020, which may contract as a consequence.

This equalization of rising or falling pressure within the housing 1010 may reduce strain on the instrument cluster or its components while resisting entry of moisture into the housing 1010, potentially reducing fogging, frosting, or corrosion damage.

Figure 11:
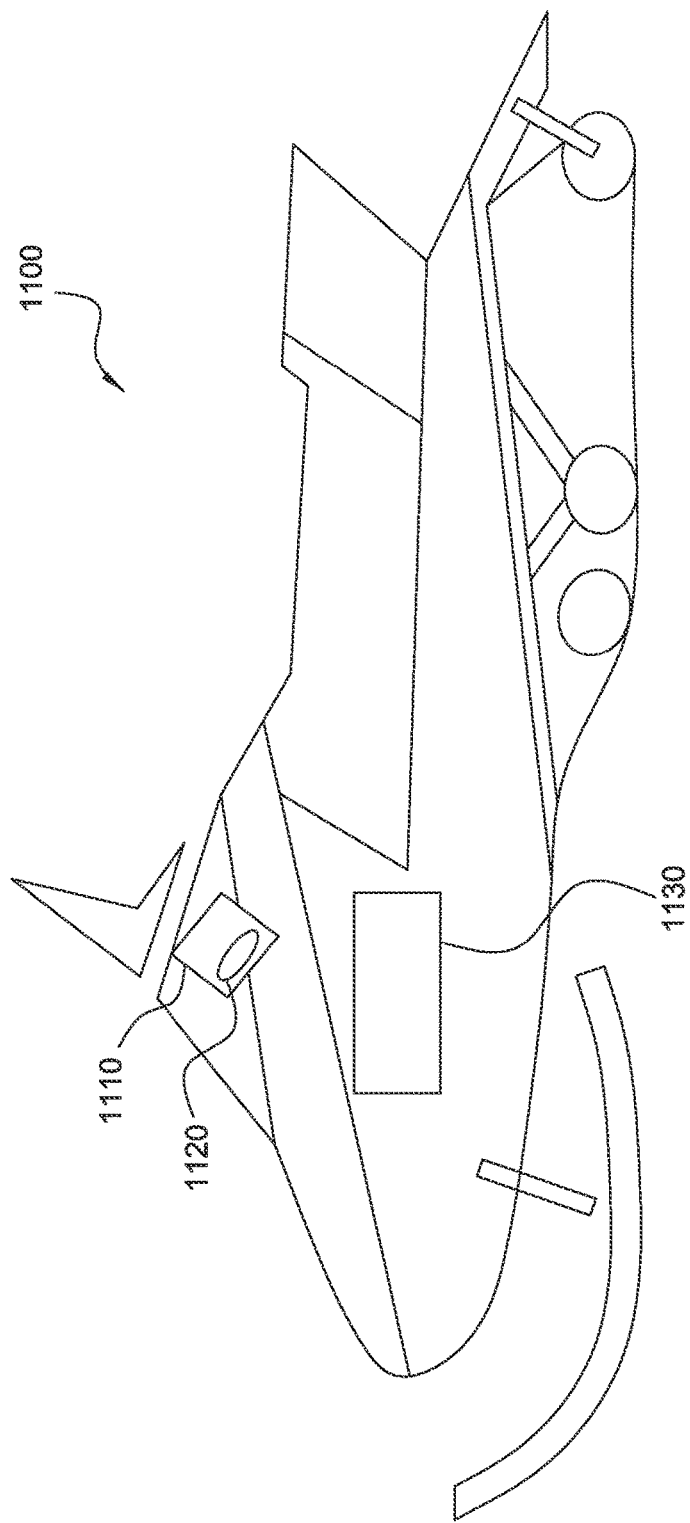
FIG. 11 is a side view of an example vehicle having an instrument cluster with an internal expandable reservoir similar to the instrument cluster shown in FIG. 4; and, FIG. 12 is a side view of an example vehicle having an instrument cluster with a remotely located external expandable reservoir similar to the instrument cluster shown in FIG. 3.

FIG. 11 illustrates an example vehicle 1100 which includes an instrument cluster having a housing 1110, a lens (not shown), and an internal reservoir 1120. The cluster, including housing 1110, lens, and reservoir 1120, may be configured similarly to cluster 400 as shown and described with respect to FIG. 4.

If the temperature of the lens drops below the dew or frost point of moisture within the housing 1110, the moisture may condense on the lens. However the isolated low moisture environment within housing 1110 may reduce or prevent fogging or frosting of the inside surface of the lens as described herein. This arrangement may also improve the service life of internal components (not shown) of the instrument cluster by reducing their exposure to moisture as described herein.

Vehicle 1100 also comprises a motor 1130. When motor 1130 is running, its temperature may rise, heating the instrument cluster. Sun shining on the instrument cluster or other conditions may likewise cause its temperature to rise. As the temperature of the sealed housing 1110 rises, pressure within housing 1110 may increase. The pressure within housing 1110 may be relieved as it forces internal reservoir 1120 to contract, expelling air from reservoir 1120 and effectively increasing the volume of space internal to housing 1110, reducing pressure therein.

If motor 1130 is subsequently shut down, its temperature may drop, allowing the instrument cluster to cool. Nightfall or other conditions may likewise cause the temperature of the instrument cluster to drop. As the temperature of the air within sealed housing 1110 drops, pressure within housing 1110 may decrease. This falling pressure (negative pressure or vacuum) may cause reservoir 1120 to expand, relieving the pressure as a consequence by drawing outside air into reservoir 1120.

This equalization of rising or falling pressure within the housing 1110 may reduce strain on the instrument cluster or its components while resisting entry of moisture into the housing 1110, potentially reducing fogging, frosting, or corrosion damage.

Figure 12:
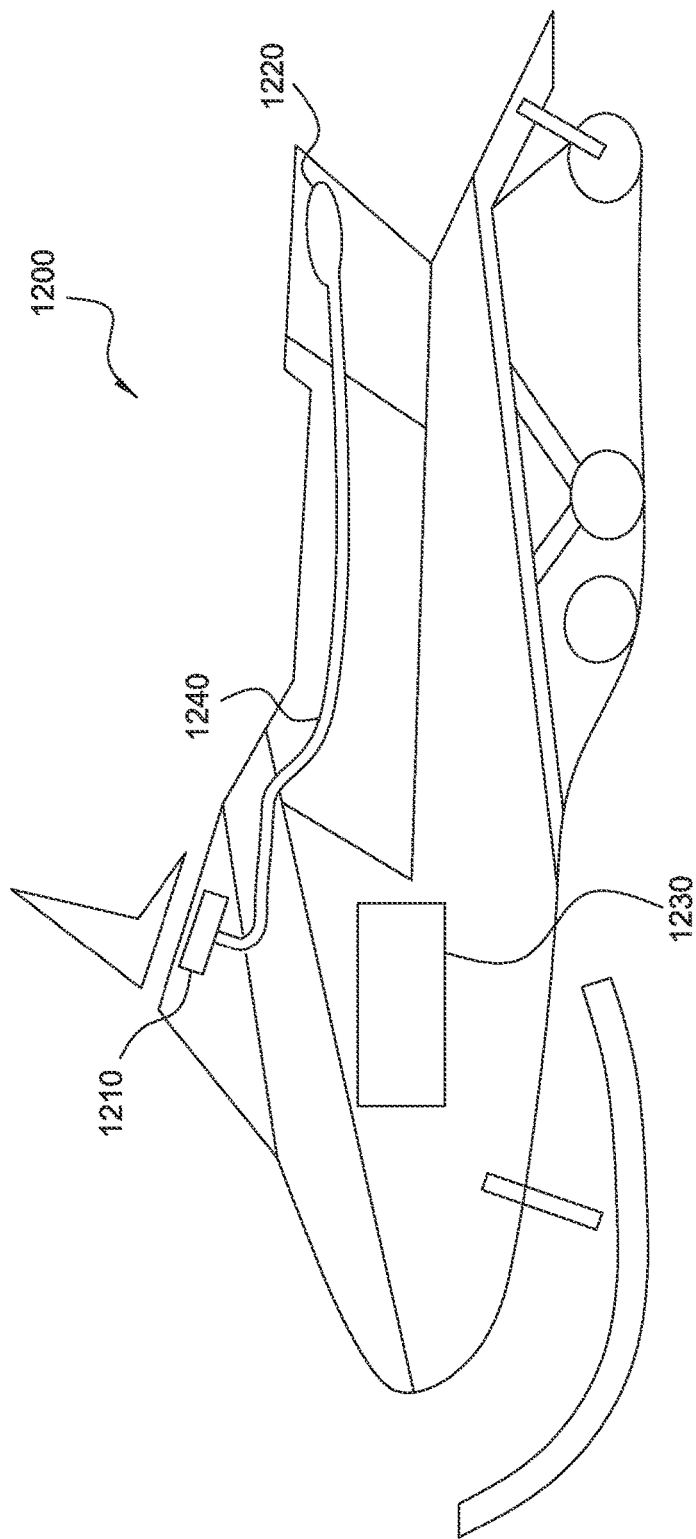

FIG. 12 illustrates an example vehicle 1200 which includes an instrument cluster having a housing 1210, a lens (not shown), and a remotely located external reservoir 1220. The housing 1210 and reservoir 1220 may be operatively connected by a tube 1240. The instrument cluster, housing 1210, reservoir 1220, and tube 1240 may be configured similarly to cluster 200 as shown and described with respect to FIG. 3.

If the temperature of the lens drops below the dew or frost point of moisture within the housing 1210, the moisture may condense on the lens. However the isolated low moisture environment within housing 1210 may reduce or prevent fogging or frosting of the inside surface of the lens as described herein. This arrangement may also improve the service life of internal components (not shown) of the instrument cluster by reducing their exposure to moisture as described herein.

Vehicle 1200 also comprises a motor 1230. When motor 1230 is running, its temperature may rise, heating the instrument cluster. Sun shining on the instrument cluster or other conditions may likewise cause its temperature to rise. As the temperature of the air within sealed housing 1210 rises, pressure within housing 1210 may increase. The rising pressure within housing 1210 may be relieved as air evacuates housing 1210 through tube 1240 into reservoir 1220, which may expand as a consequence.

If motor 1230 is subsequently shut down, its temperature may drop, allowing the instrument cluster to cool. Nightfall or other conditions may likewise cause the temperature of the instrument cluster to drop. As the temperature of the air within sealed housing 1210 drops, pressure within housing 1210 may decrease. This falling pressure (negative pressure or vacuum) may be relieved as air is drawn into housing 1210 through tube 1240 from reservoir 1220, which may contract as a consequence.

As shown in FIG. 12, reservoir 1220 is located toward the rear of vehicle 1200, away from housing 1210 and motor 1230. This location of reservoir 1220 may be subject to fewer changes in temperature or pressure as a consequence. This location may permit installation of housing 1210 in a more constrained space and/or limit strain and expansion of reservoir 1220 as described herein. This equalization of rising or falling pressure within the housing 1210 may reduce strain on the instrument cluster or its components while resisting entry of moisture into the housing 1210, potentially reducing fogging, frosting, or corrosion damage.

It is noted that condensation, fogging, and frosting may also occur in other types of instruments, such as telescopes and other optics, or other objects and devices having a lens and a housing. Although a vehicle instrument cluster is used herein to describe various techniques, it is noted that the various techniques discussed herein may be applied to any of these types of instruments and optics, or to other objects having a lens and a housing.

Although features and elements are described above in particular combinations, one of ordinary skill in the art will appreciate that each feature or element can be used alone or in any combination with the other features and elements.

What is claimed is:

1. A vehicle instrument configured to reduce lens fogging or frosting, the instrument comprising:
   a housing which comprises a vent and is disposed in a first distal end at a front area of the vehicle;
   a lens having a surface exposed to an interior space within the housing; and,
   an expandable reservoir operatively connected to the vent;
   wherein the interior space is hermetically isolated from an exterior of the housing;
   wherein the reservoir is hermetically isolated and liquid-tight from a surrounding environment such that moisture and air are prevented from entering the housing;
   wherein the reservoir is operatively connected to the vent by a tube;
   wherein the housing is disposed in an instrument cluster of the vehicle; and
   wherein the reservoir is disposed in a second distal end at a rear area of the vehicle opposite the first distal end of the vehicle.

2. The instrument of claim 1, wherein the interior space within the housing is in communication with an interior space of the reservoir.

3. The instrument of claim 1, wherein the reservoir is disposed exterior to the housing.

4. The instrument of claim 1, wherein the reservoir is disposed at least partially within the interior space of the housing.

5. The instrument of claim 1, wherein the reservoir comprises a sleeve, or a piston.

6. The instrument of claim 1, wherein the reservoir comprises a flexible material.

7. The instrument of claim 1, further comprising an anti-fog treatment which comprises a surfactant, a hydrophilic substance, or a hydrophilic surface.

8. A method for reducing fogging or frosting of an instrument lens, the method comprising:
   providing an instrument housing disposed in a first distal end at a front area of the vehicle which comprises a vent, an interior space, and an interior surface;
   providing a lens disposed such that the interior surface comprises a surface of the lens; and,
   operatively connecting a reservoir to the vent such that the interior space is hermetically sealed from an exterior of the housing;
   wherein the reservoir is hermetically sealed and liquid-tight from a surrounding environment such that moisture and air are prevented from entering the housing;
   wherein the reservoir is operatively connected to the vent by a tube;
   wherein the housing is disposed in an instrument cluster of the vehicle; and
   wherein the reservoir is disposed in a second distal end at a rear area of the vehicle opposite the first distal end of the vehicle.

9. The method of claim 8, wherein a gas may pass between the interior space of the housing and the interior space of the reservoir through the vent.

10. The method of claim 8, wherein the reservoir is disposed exterior to the housing.

11. The method of claim 8, wherein the reservoir is disposed at least partially within the interior space of the housing.

12. The method of claim 8, wherein the reservoir comprises a bladder, a bellows, a sleeve, or a piston.

13. The method of claim 8, wherein the reservoir comprises a flexible material.

14. The method of claim 8, wherein the instrument housing further comprises a desiccant or an anti-fog treatment.

* * * * *